Patented Aug. 30, 1949

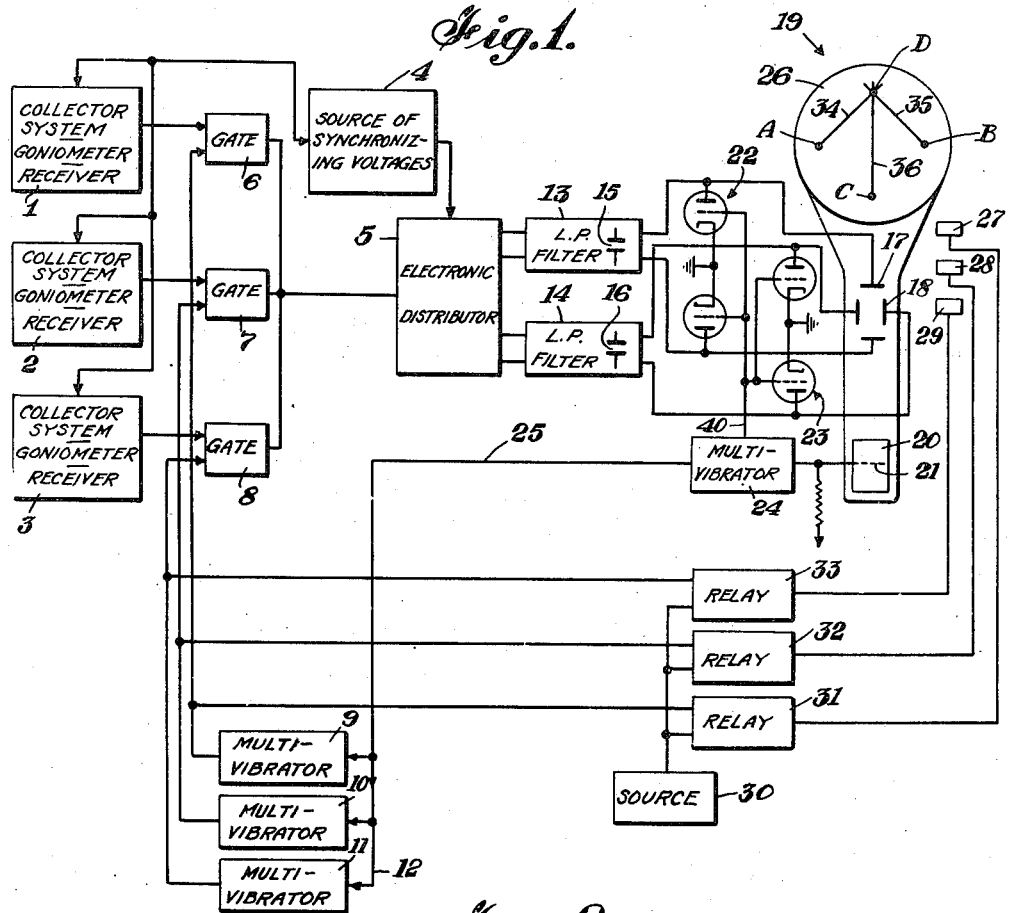
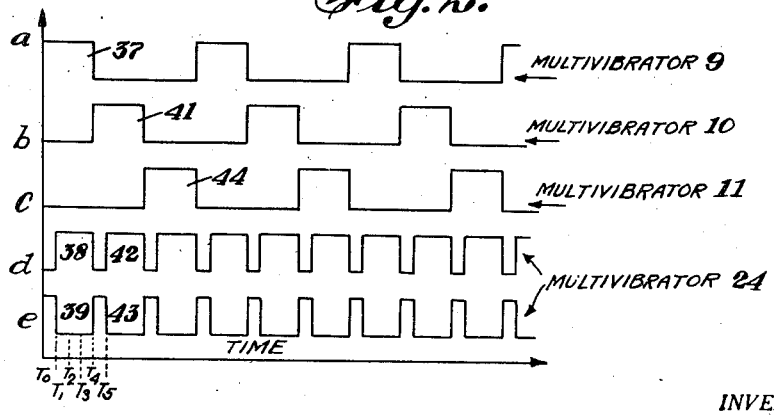

2,480,152

UNITED STATES PATENT OFFICE 2,480,152

POSITION INDICATING SYSTEM

Mark Mandel, Brooklyn, N. Y., assignor to Federal Telecommunication Laboratories, Inc., New York, N. Y., a corporation of Delaware Application July 2, 1946, Serial No. 680,889

2 Claims. (Cl. 343—112)

This invention relates to a position-indicating system for indicating the position of objects, and particularly for indicating the position and the variation of position of a moving object such as for example, an airplane.

In determining the position or location of an object, such as for example, a transmitter, it has been customary to obtain two lines of direction from two separate direction finding stations, and by the process of triangulation find the exact position of the transmitter. This technique involving the use of calculations entails some delay in determining the location of the transmitter. Furthermore, if the transmitter is located on a moving object, such as for example, a transmitter on an airplane, this procedure of triangulation tends to become cumbersome in attempting to follow the flight of the plane.

An object of the present invention is the provision of a position-indicating system which provides instantaneous indications of the position or location of an object, particularly of a transmitter.

Another object of the present invention is the provision of a direction finding system which gives instantaneous indications of the position and variation of position, or movement, of a moving transmitter.

In accordance with a feature of the present invention, two or more spaced collector systems are used in producing on the screen of a cathode ray tube lines of direction, the intersection of these lines of direction being an indication of the location of the transmitter. If the object is a moving object, the two lines of direction shift, producing a shift in the point of intersection. At these points of intersection, due to the coincidence of the two different traces, there is a higher intensity of light than over the general area of the lines of direction. As the lines of direction shift with the moving of the transmitter, the intersection of these lines vary and trace a relatively bright line indicating the movement of the moving object.

In accordance with another feature of the present invention, a direction finder is employed utilizing a cathode ray tube in which the beam is initially offset from the center of the tube screen to correspond with the remote or offset position of the collector system. The beam is then deflected from said initial position along a line corresponding to the line of direction to the transmitter.

Another object of the present invention is the provision of an improved direction finder, and particularly one in which the beam in the direction indicating cathode ray tube is initially offset from the center of the tube screen to correspond with the remote or offset position of a remote collector system, and in which the beam is then deflected from said initial position along the line corresponding to the direction of the transmitter from the collector system.

Other and further objects of the present invention will become apparent and the invention will be best understood from the following description of an embodiment thereof, reference being had to the drawings, in which:

Fig. 1 is a schematic and block diagram of a system embodying my invention; and

Fig. 2 is a set of curves used in explaining the operation thereof.

Referring now to Fig. 1, three spaced collector systems 1, 2 and 3 are arranged at three spaced locations which will be hereinafter referred to as A, B and C. The collector systems 1, 2 and 3 may be for example, Adcock arrays, each of whose directive patterns are rotated by means of an electronic goniometer. A direction finding receiver may also be located at each of said positions. Assuming that the object to be detected is an airplane which is transmitting a signal, the collector systems 1, 2 and 3 each are adapted to receive energy from said object as each of said collector systems rotates its directive pattern. To control the rotation of the electronic goniometers associated with each of the collector systems, 1, 2 and 3, a source of synchronizing voltages 4 may be employed which controls all three collector systems 1, 2 and 3. The synchronizing voltages from source 4 are also used to control the operation of an electronic distributor 5 to which energy derived from collector systems 1—3, is sequentially fed through suitable switching means such as for example, gates 6, 7 and 8, which are sequentially opened by voltages derived from suitable control sources such as multivibrators 9, 10 and 11 respectively. Multivibrators 9—11 are synchronized as indicated by the line 12 so that each supplies an unblocking voltage successively to its respective gate, whereby the gates 6—8 open sequentially and the electronic distributor 5 is fed from energy derived from collectors 1, 2 and 3 sequentially.

The electronic distributor 5 may be of any suitable type and may consist, for example, of two balanced modulators having a common modulating signal input and four separate outputs with four tubes which feed said outputs being controlled by 4 voltage waves from source 4, said waves being 90° out of phase with each other, as is more fully described in the copending application of L. L. Libby-E. Cole, for "Direction finding system," Serial No. 647,603, filed February 14, 1946. The four outputs of the electronic distributor 5 are then fed through two low pass filters 13 and 14 respectively to charge condensers 15 and 16 respectively in said filters. Low pass filter 13 and low pass filter 14 are connected to the vertical and horizontal deflecting electrodes 17 and 18 respectively of a cathode ray tube 19, which tube 19 is provided with the usual electron gun 20 having a control or intensifier grid 21.

As each collector system is connected to the electronic distributor, a voltage is built up on the condensers of the low pass filters 13 and 14 producing a deflection of the electron beam in accordance with the direction from said collector system of the object to be located. As switching occurs from one collector system to the next, the condensers 15 and of the low pass filters 13 and 14 are discharged, as for example, by balanced tube arrangements 22 and 23 respectively which are coupled to the output of a multivibrator 24 which is in turn controlled by multivibrator 9 indicated by line 25. The multivibrator 24 also controls the turning on and turning off of the beam, that is, it controls the intensifier grid 21 in a manner which will be hereinafter described.

As stated hereinbefore, lines are produced on the screen, hereinafter designated by the numeral 26, starting from a position corresponding to the location of the collector and moving in a direction toward the object to be located. For the purpose of initially deflecting the beam to a position corresponding to the positions of the collector systems, use may be made of three coils 27, 28 and 29 energized from a source 30 through relays 31—33 respectively. The relays 31—33 are controlled by the voltages from multivibrators 9—11 respectively.

The operation of the foregoing system is as follows. The beam is sequentially deflected to three positions, A, B and C on the screen 26 of cathode ray tube 19, which positions correspond to the location of collector systems 1, 2 and 3. During such deflections from positions A to B to C, the screen is not illuminated. When, however, the beam is at one of said positions, energy from the collector system associated therewith is used to deflect the beam along a line corresponding to the position of the object, designated by the letter D, from the collector system. Thus three lines 34, 35 and 36 will be drawn from the three original positions A, B and C toward the object D and the inter-section of these lines indicates the position of the object D.

The foregoing may be accomplished by the use of suitable control voltages derived from multivibrators 9, 10, 11 and multivibrator 24. Referring to Fig. 2, curves $a$, $b$ and $c$ represent substantially the timing of the rectangular wave output pulses derived from multivibrators 9, 10 and 11 respectively, while curves $d$ and $e$ represent the two outputs from multivibrator 24.

A typical cycle of operation is now described, reference being had to the curves of Fig. 2. At time $T_0$, multivibrator 9 starts a rectangular pulse which has a duration $T_0$ to $T_4$. At the end of $T_4$, the rectangular wave pulse from multivibrator 9 ceases and one from multivibrator 10 commences. The rectangular pulse 37 from multivibrator 9 at time $T_0$ operates on relay 31 to apply current from source 30 to deflection coil 27 and move the beam to a position corresponding to A on the screen. The cathode ray tube 19, however, is blocked out during this time and so no trace is made on the screen. Pulse 37 at $T_0$ also opens gate 6 coupling collector system 1 to the electronic distributor 5. Assuming that the time between $T_0$ and $T_1$ is sufficient to cause the beam to have reached position A at time $T_1$ the multivibrator 24 is flipped by voltages delivered thereto over line 25, this delay being provided for in the constants of said multivibrator or if desired a suitable delay device may be inserted before it. The tripping of multivibrator 24 starts a rectangular wave pulse 38 which is applied in a positive direction to the intensifier grid 21 of cathode ray tube 19 to turn on the beam. At the same time, pulse 39 which is of inverted polarity with respect to pulse 38 is taken off multivibrator 24 along line 40 and is used to block conduction in balanced tubes 22 and 23, thereby halting discharge of condensers 15 and 16 and permitting the charge on said condensers to begin to build up. As the charge on said condensers builds up, due to the energy being received on collector system 1 and fed appropriately to said condensers by the operation of the electronic distributor 5, the beam will be deflected and a trace will be produced along line 34. At time $T_4$, pulse 37 ends, thereby closing gate 6. Pulses 38 and 39 likewise terminate at the time $T_4$, thereby respectively turning off the illumination in cathode ray tube 19 and simultaneously causing balanced tubes 22 and 23 to conduct, thereby discharging condensers 15 and 16. At time $T_4$, multivibrator 10 begins to produce a control pulse 41 which opens gate 7, thereby connecting the collector system 2 to the electronic distributor and energizes relay 32, thereby supplying current to deflection coil 28 and moving the beam toward position B. While the beam is being moved toward position B, that is, between times $T_4$ and $T_5$, condensers 15 and 16 are discharged. At time $T_5$, multivibrator 24 again vibrates and produces a second group of pulses 42 and 43, corresponding in duration and function to pulses 38 and 39 with pulse 42 illuminating the cathode ray tube, and pulse 43 blocking conduction of tubes 22 and 23 to thereby enable condensers 15 and 16 to be charged by the incoming signal. As has been described before, as condensers 15 and 16 are being charged, the trace is deflected from position B on a line 35 toward position D corresponding to the position of the object. At the end of pulse 41, multivibrator 11 operates to produce a pulse 44 similar to pulses 37 and 41 and performing the same functions with respect to collector system 3 and deflection coil 29. The beam is initially deflected by coil 29 to position C and then a trace is produced along the line 36 corresponding to the direction of the object from the collector system 3.

While I have described the use of three collector systems, it will be apparent that two or many more could be employed to provide intersecting lines of direction. Furthermore it will be equally obvious that instead of having the receivers located at the collector systems, a single receiver may be employed, located for example, at a central location adjacent the cathode ray tube. In addition, other switching arrangements than those shown may be employed to produce substantially the same mode of operation as will be apparent to those versed in the art. For example, instead of using multivibrators, other rectangular wave generators may be used, and instead of gates 6, 7 and 8, relays may be substituted. A single set of deflection coils deflecting in rectangular coordinates may be used to replace the three coils 27, 28 and 29 and switching to the different initial positions A, B and C may be accomplished by switching the voltages applied thereto. Numerous other changes within the scope of the invention will become apparent to those versed in the art from the foregoing description.

Furthermore while I have described a system in which a plurality of lines are produced on the screen, which intersect and indicate position, it will be apparent that in accordance with one aspect of my invention a single direction finder with a remotely located collector system may be employed, with the location of the collector system corresponding to an offset position to which the beam is initially deflected, the line of direction on the screen being drawn from said initial position along a line corresponding to the direction of the transmitter from the collector system.

Accordingly, while I have described above the principles of my invention in connection with specific apparatus, it is to be clearly understood that this description is made only by way of example and not as a limitation on the scope of my invention.

I claim:

1. A system for indicating the position of an object, comprising a plurality of spaced collector systems, a cathode ray tube, a first means for successively deflecting the beam of said tube to positions on the screen corresponding to the locations of each of said collector systems, a second means comprising a plurality of condensers, means responsive to energy absorbed by each of said collector systems for charging said condensers in accordance with the direction of the object with respect to said collector systems, and means for deflecting the beam along the screen from each of said screen positions in lines corresponding to the direction of said object from each of said collector systems, whereby the intersection of said lines indicates the position of said object.

2. A system according to claim 1, wherein said first means comprises a separate means for deflecting said beam for each of said screen positions, and means for successively energizing each of said separate means; and further including means for turning on the beam during at least part of each period in which said condensers are being charged.

MARK MANDEL.

REFERENCES CITED

The following references are of record in the file of this patent:

UNITED STATES PATENTS

| Number | Name | Date |
| --- | --- | --- |
| 2,183,634 | Zworykin | Dec. 19, 1939 |
| 2,209,191 | Dearing | July 23, 1940 |
| 2,399,671 | Gage | May 7, 1946 |
| 2,422,100 | Huff | June 10, 1947 |